UNITED STATES PATENT OFFICE.

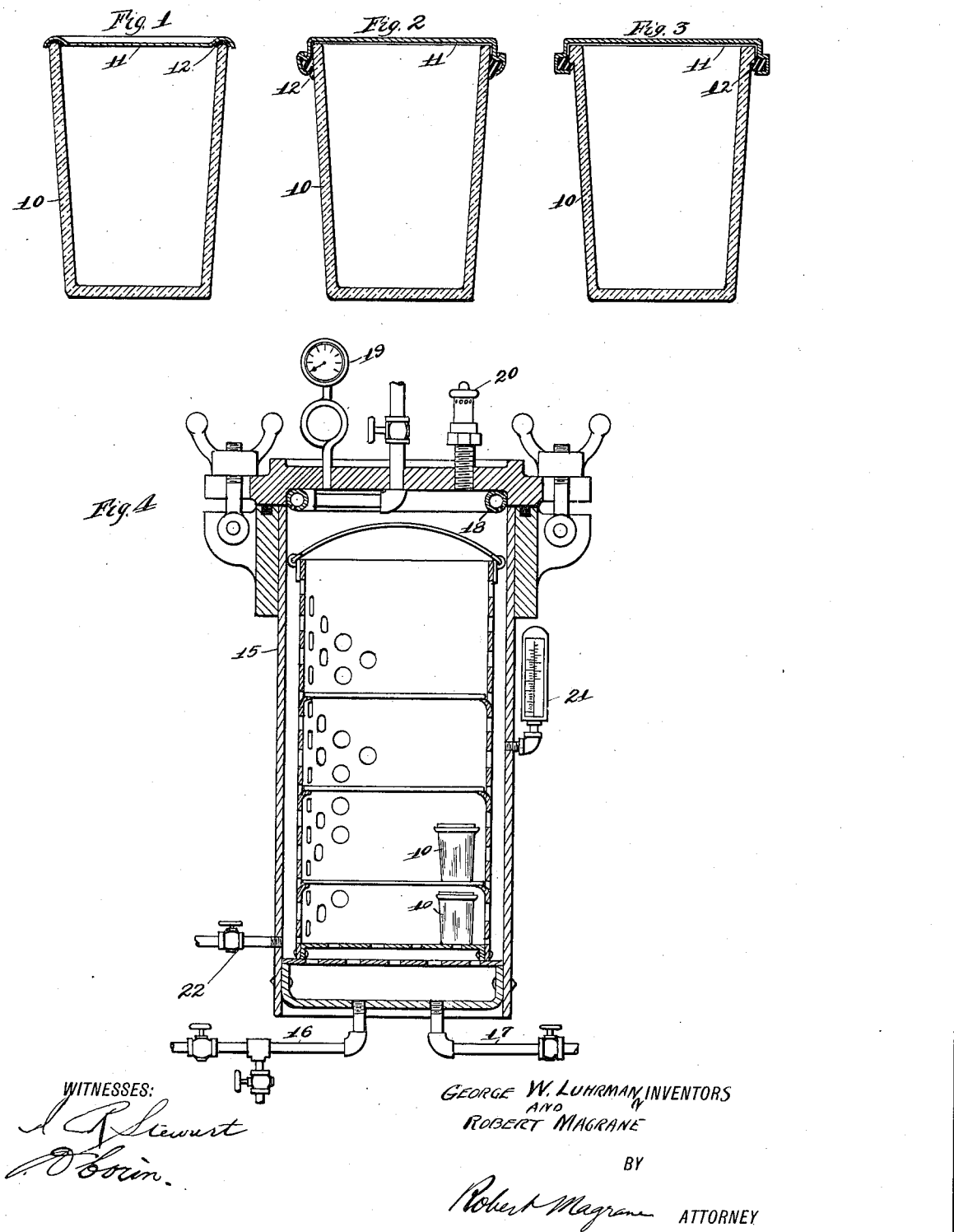

GEORGE W. LUHRMANN, OF JERSEY CITY, NEW JERSEY, AND ROBERT MAGRANE, OF NEW YORK, N. Y., ASSIGNORS TO ANCHOR CAP & CLOSURE CORPORATION, OF BROOKLYN, NEW YORK, A CORPORATION OF NEW YORK.

PROCESS OF PRESERVING.

1,184,249.      Specification of Letters Patent.      Patented May 23, 1916.

Application filed March 10, 1915. Serial No. 13,517.

*To all whom it may concern:*

Be it known that we, GEORGE W. LUHRMANN and ROBERT MAGRANE, citizens of the United States, and respectively residing at Jersey City, in the county of Hudson and State of New Jersey, and at New York, in the county of Queens and State of New York, have jointly invented new and useful Improvements in Processes of Preserving, of which the following is a specification.

This invention relates to methods for preserving food and the like, and has particular reference to the processing of foodstuffs in glass receptacles or other forms of sealed containers.

The objects of invention include a method adapted to process goods at a low cost and in glass containers, to secure a better product with less impairment of flavor and with greater keeping qualities, and to reduce the losses of containers and goods that occur in processing.

Referring to the drawings: Figures 1, 2 and 3 represent sectional elevations of typical forms of glass containers in which are packed the material to be processed; and Fig. 4 is a sectional elevation, partly diagrammatic, of a process kettle and its various attachments which are of use in carrying out the improved method.

In the usual method of processing food the containers are provided with a vent, which is sealed after the goods are processed. In some cases the containers are first sealed, and are placed in a process kettle or retort where they are subjected to the action of heat supplied directly or indirectly by heated water or steam. The temperature and the length of time the processing is carried on depend upon the character of the food to be sterilized, also to some extent upon the size and character of the container.

In a typical case, the processing of meat or fish, by direct steam heat, the containers are subject to the heat of saturated steam at a pressure of about 25 pounds absolute (10 pounds, steam gage) and the resulting temperature at this pressure is about 240 degrees F. The time of processing for a ten ounce container is one hour.

If the heat be unnecessarily high, or maintained for too long a time, the flavor of the foodstuff is greatly injured, and it is desirable that the food be processed at the lowest temperature and in the shortest space of time that will effectively preserve the goods.

Furthermore, to process food under the best conditions so that the flavor will be impaired as little as possible and so that the food itself will keep without spoiling for long periods of time, it is desirable that the goods be packed in glass containers in preference to tin, and the food should also be kept from contact with oxygen or air during and after the sterilization to eliminate oxidation and discoloration of the food at the comparatively high sterilizing temperatures, and during the comparatively long time the goods are kept before they are used. In the improved method herein disclosed, this oxidation and discoloration which occurs during and after processing is checked or prevented by sealing the container under a vacuum before it is placed in the retort. The container is preferably made of glass, as indicated at 10 in Figs. 1, 2 and 3, and is hermetically sealed by a closure 11 and an interposed sealing gasket 12. In Fig. 1, the closure seal is made by atmospheric pressure; in Fig. 2, there is shown a mechanical friction seal; and in Fig. 3, a locking seal. The food is inserted in the container, the air is withdrawn and the closure 11 applied to seal the package in each case. The containers are then placed in the retort and subjected to the processing heat.

In processing with steam under pressure, the temperature and the pressure of the steam (saturated) have a mutual relation in accordance with well known laws, the pressure and the temperature increasing and decreasing together in definite steps so that any given temperature has a definite related pressure and vice versa. As in the case cited above, the fact that saturated steam is under ten pounds gage pressure indicates also that its temperature is 240 degrees F. Repeated experiments have shown, however, that the temperature and pressure values of the foodstuffs within the container do not vary in like proportion to steam, and that when such material is heated in a confined space such as the sealed container, the pressure generated within the container is much greater in proportion to the temperature than is the case with the saturated steam outside of the container. This difference is very marked in practice.

If a container be filled with meat or fish, sealed hermetically under a vacuum, it may then have an internal pressure of about one pound absolute per sq. in. If it be placed in a retort having live steam at a temperature of 240 degrees F., the pressure outside of the container and acting upon it externally will be about 25 pounds absolute per sq. in. As the contents of the container become heated, however, the pressure will rise rapidly so that when the contents reach the temperature of the steam (240 F.) the container may have an internal pressure of about 45 pounds absolute per sq. in., is subject to a bursting strain of 20 pounds per sq. in. and may either blow out or blow up. For this reason, the processing of food in sealed cans or glass is more difficult than in the case of vented cans. The glass container, in particular, and its closure cannot be seamed and doubleseamed together as in the case of the tin can, and it cannot withstand as much internal pressure. Attempts to remedy this trouble by applying temporary clamps to the closures during processing have been unsuccessful. When the closure is thus clamped on, or when it is held in place by a locking shoulder on the glass as shown in Fig. 3, the internal pressure is sufficient in many cases to blow out the gasket or to rupture it at some point and the contents of the container escape through the break in the gasket, spoiling that particular container and soiling all the others that are nearby. Attempts have also been made in processing to create a counter- or supersteam pressure outside of the containers by compressed air so that the external pressure will always be greater than the internal pressure. These attempts have been only partially successful as the air was not also withdrawn from the container before sealing so that there was an excessive pressure inside the container and an unnecessarily greater pressure had to be maintained outside of the container. The presence of the air within the container also operated to oxidize the food during the sterilization, resulting in more or less discoloration of the product and a lessening of the food value of the product.

In carrying out our improved method, we pack the food material in the container and seal the container with its closure after exhausting the air therefrom. The sealed package exhausted of air is then placed in the process kettle where it is subjected to a suitable processing heat such as that derived from live steam and at the same time to an external pressure such as caused by the steam and heated compressed air, the pressure outside the container being such as to exceed the pressure generated within it. After processing the package is cooled in any suitable way, the external pressure being maintained also during the cooling so that at all times it is greater than the pressure within the package.

A diagrammatic arrangement of a process kettle adapted to carry out the improved method is shown in Fig. 4. The temperature in the retort 15, within which the containers are placed, is controlled by steam inlet 16. The pressure is controlled by admission of compressed air, preferably preheated, through inlet 17. A rose 18 supplies water for cooling purposes. A steam gage is indicated at 19, a safety valve at 20, a thermometer at 21 and a blow-off cock at 22.

In the case of processing meat cited above, the temperature in the retort is maintained at 240 degrees F, while the pressure is kept at about 30 pounds (steam gage) or 20 pounds more than the pressure of saturated steam at 240 F. Under these conditions meat can be packed in glass containers such as that shown in Fig. 1 where the closure is held in place only by atmospheric pressure.

By packing the goods, preferably in glass, in a vacuum, and applying the processing heat and supersteam pressure to the package so formed, as described above, it has been possible to preserve foodstuffs to the best advantage, it being possible to process the food at the minimum temperatures and pressures, thereby preserving the food value and the flavor to the greatest possible extent.

A further advantage in the use of glass is that it is as chemically inert at sterilizing temperatures as it is at ordinary temperatures, and various foodstuffs may be packed and sterilized in glass which it would be difficult if not impossible to preserve and process in tin owing to the possible chemical combinations set up at high sterilizing temperatures between the food material and the tin, iron and impurities present in the iron.

The material may be sterilized by direct contact with heated water or steam, under pressure, or by heated air, or it may be done indirectly, the particular manner forms no part of the present invention. The superpressure is a fluid pressure which may be transmitted by compressed air or other gas, or by water or other fluid, its characteristic being that at any given temperature, its pressure is greater than the pressure of saturated steam at the given temperature.

It is obvious that many modifications may be made in the improved method of preserving herein disclosed and the invention is not limited in its breadth and scope to the particular means herein shown and described.

We claim:

1. The method of preserving food which consists in packing the material in a container, sealing the container under a vacuum, subjecting the container and contents to a sterilizing heat, allowing them to cool, and maintaining meanwhile, during the heating and cooling operations, an exterior fluid pressure upon the container that is in excess of the pressure within the container.

2. The method of preserving food which consists in packing the material in a glass container, sealing a closure to the container under a vacuum, subjecting the sealed container and contents to a sterilizing heat, allowing them to cool, and maintaining meanwhile, during the heating and cooling operation, an exterior fluid pressure upon the container that is in excess of the pressure within the container.

3. The method of preserving food which includes the packing of material in a container, sealing the container under a vacuum, subjecting the container and contents to a sterilizing heat, and maintaining during the heating operation an exterior fluid pressure upon the container that is in excess of the pressure within the container.

4. The method of preserving food which includes the packing of material in a container, sealing the container under a vacuum, subjecting the container and contents to a sterilizing temperature for an effective period and to a fluid pressure that is in excess of the pressure of saturated steam at the given temperature.

5. The method of preserving food which includes the packing of material in a container, sealing the container under a vacuum, and then subjecting the container and material to a sterilizing heat and a fluid pressure that is in excess of the pressure inside the container.

6. The method of preserving food which includes the packing of material in a glass container, sealing the container under a vacuum, subjecting the container and contents to the heating action of live steam under pressure in contact with the container, and maintaining an exterior pressure of the steam used to supply the heat.

7. The method of preserving food which consists in packing the material in a glass container, sealing the container under a vacuum, subjecting the container directly to the action of steam at a sterilizing temperature for a required period, and at the same time to an external pressure of gas such as compressed air which has a greater pressure than the pressure of the steam at the sterilizing temperature, cooling the container by water, and maintaining the said external pressure of gas during the cooling.

GEORGE W. LUHRMANN.
ROBERT MAGRANE.

Witnesses:
DAVID CONN,
J. R. STEWART.